United States Patent [19]
Loeffler

[11] 3,914,196

[45] Oct. 21, 1975

[54] POLYMERIC PIGMENTS AND METHOD FOR PREPARATION THEREOF

[75] Inventor: Norman Raymond Loeffler, Freeport, Tex.

[73] Assignee: The Dow Chemical Company, Midland, Mich.

[22] Filed: Dec. 10, 1973

[21] Appl. No.: 423,040

[52] U.S. Cl. 260/29.7 H; 117/155 UA; 260/29.6 TA; 260/29.6 MN; 260/29.7 T; 260/29.7 N; 260/80.73; 260/80.8; 260/80.81; 260/82.7; 260/84.3

[51] Int. Cl.² .......................................... C08F 19/18

[58] Field of Search... 260/29.6 TA, 29.7 N, 29.7 T, 260/29.7 H, 80.73, 80.8, 80.81, 82.7, 84.3; 117/155 UA

[56] References Cited
UNITED STATES PATENTS

| | | | |
|---|---|---|---|
| 3,438,926 | 4/1969 | Burke | 260/29.7 N |
| 3,501,432 | 3/1970 | Wright et al. | 260/29.6 TA |
| 3,595,823 | 7/1971 | Huang | 260/29.6 T |
| 3,634,298 | 1/1972 | Wamsley et al. | 260/29.6 TA |
| 3,784,498 | 1/1974 | Ceska | 260/29.6 TA |
| 3,819,557 | 6/1974 | Loeffler et al. | 260/29.6 TA |

FOREIGN PATENTS OR APPLICATIONS 678,279   9/1952   United Kingdom

OTHER PUBLICATIONS

Blackley, *High Polymer Latices*, I, 279 (Applied Science, 1966).

Blackley, *High Polymer Latices* I, 113, 127–130, (Palmerton, 1966).

*Primary Examiner*—Murray Tillman
*Assistant Examiner*—Thomas De Benedictis
*Attorney, Agent, or Firm*—M. S. Jenkins

[57] ABSTRACT

Improved polymeric pigments for use in paper coatings are provided by a soap-free, emulsion polymerization process comprising the steps of (1) emulsion polymerizing at least 20 weight percent of total emulsion polymerizable monomer, (2) adding fluid base and (3) continuing emulsion polymerization of the remaining monomer charge.

15 Claims, No Drawings

POLYMERIC PIGMENTS AND METHOD FOR PREPARATION THEREOF

BACKGROUND OF THE INVENTION

This invention relates to polymeric pigments for lightweight paper coatings having high opacity and visual gloss and to a method for the preparation thereof.

Most paper surfaces require a coating in order to have good printing qualities and sufficient opacity. Conventional paper coatings contain inorganic pigments such as kaolin clay or titanium dioxide to give the coated paper substrate the opacity required. However, the inorganic pigments substantially increase the coating weight which in turn increases the cost of mailing substrates so coated.

Lightweight paper coatings contining as pigment, discrete polymeric particles which are insoluble in water and the binder of the coating and which retain their discrete character and particle size of 0.3 to 0.8 micrometer during coating operation have been disclosed in Belgian Pat. No. 733,548.

Recently, improved plastic pigments have been provided by an emulsion polymerization method described in application Ser. No. 177,431 filed Sept. 2, 1971. In accordance with that method, emulsion polymerization of the monomer is begun in the absence of soap, soap is then added after aqueous dispersion of the monomer after at leeast 50 weight percent of total monomer is polymerized, and emulsion polymerization of remaining monomer is completed. Unfortunately, the residual soap in the resulting plastic pigment caused coatings of pigment to stick to the calender roll during calendering. Also, an amount of soap often remains in the emulsion polymerization reactor which deleteriously affects subsequent runs. Thus, it is often necessary to clean the reactor after a few runs. In addition, the presence of soap in pigment formulation during normal usage often causes excessive foaming.

Therefore, it would be highly desirable to provide a method for making the improved pigment which does not require the use of soap.

SUMMARY OF THE INVENTION

In accordance with the present invention, there is provided a novel, soap-free, improved polymeric pigment and a method for the preparation thereof.

In one aspect, the present invention is an aqueous dispersion of the soap-free polymeric pigment. The polymeric pigment comprises discrete particles of non-film forming, water-insoluble polymer of emulsion polymerizable monomer. The aqueous dispersion of polymeric pigment is prepared by the method described hereinafter. The discrete particles which comprise the polymeric pigment of this invention have an average diameter in the range from about 0.3 to about 1.0 micrometer with no more than about 5 weight percent of the particles based on total weight of the discrete polymeric particles of the polymeric pigment having diameters outside of said range.

In a second aspect, this invention is a method for preparing the aqueous dispersion of polymeric pigment. This method is a modified emulsion polymerization process comprising the steps of (1) subjecting to emulsion polymerization a polymerization recipe containing an aqueous medium, a catalyst and an incrementally-added initial portion of emulsion polymerizable monomer to conditions of emulsion polymerization essentially in absence of soap, said initial portion of monomer constituting at least about 20 weight percent up to and including 99.9 weight percent of total monomer; (2) subsequently adding to the polymerization recipe a stabilizing amount of a fluid base based on total monomer; and (3) continuing addition and emulsion polymerization of remaining monomer also in the absence of soap. For the purposes of this invention, a "stabilizing amount" of base means an amount which is sufficient to stabilize the resulting latex against gelation (i.e., the formation of gel particles) and which does not thicken the latex such that it cannot be combined with conventional pigment binder to provide a composition which can be applied to a paper substrate by conventional means. A "fluid" base means a base in gaseous, e.g., ammonia, or liquid, e.g., dimethylaminoethanol or aqueous solutions of sodium hydroxide or ammonia, form. The absence of soap in the foregoing process permits repeated runs in the same polymerization vessel without cleaning vessel after each run. In addition, the resulting soap-free pigment formulation does not foam excessively during normal usage.

As a third aspect of this invention, there is provided an improved paper coating composition comprising from about 1.3 to about 11.5 parts by volume of binder per about 38.8 parts by volume of a pigment, at least a portion of which pigment is the aforementioned polymeric pigment which is substantially insoluble in the binder under conditions normally employed in paper coating processes. Said portion of polymeric pigment is sufficient to impart lightweight and/or improved properties such as opacity, brightness, gloss, and printing qualities to dried coatings of said paper coating compositions.

As a fourth aspect of this invention, there is provided a coated paper article comprising a paper substrate having intimately adhered thereto a dried coating of the aforementioned composition wherein the polymeric pigment essentially retains its original discrete character and original particle size.

The practice of this invention utilizing at least an effective amount of the polymeric pigment produces a coated substrate which has a level, unpocked surface and a considerably decreased coating weight. Such coated substrates possess measurably improved brightness, opacity, gloss, and printing qualities as compared to the same properites of a substrate having an adherent coating of binder and non-film forming polymeric particles prepared by conventional emulsion polymerization processes.

DESCRIPTION OF THE PREFERRED EMBODIMENTS

The discrete particles useful as the polymeric pigment are composed of any non-film forming organic polymer which is water-insoluble and is insoluble in the particular binder to be used in the coating composition. Preferred polymers are thermoplastic, organic, resinous materials which are substantially colorless.

By "non-film forming", it is meant that the dispersed polymeric pigment does not coalesce to form a film at ambient temperature and at temperatures selected to dry or finish the coated article. While such temperature requirement varies with the type of finishing method used, it is preferred that the polymer in the form of the discrete particles not be film forming at temperatures of 140°F or less if the coated surface is to be finished by processes such as calendering or super calendering. If the discrete polymeric particles throughout the coating are permitted to fuse or coalesce during the coating process, the light scattering properties (opacity) of the coated surface will be reduced substantially. Accordingly, polymers preferred for use as the polymeric pigment have a Vicat Softening Point, as defined and determined by ASTM D-1525-65-T, of greater than about 140°F. For the same reasons, it is also necessary to use polymeric particles which are not dissolved or softened by the particular binder chosen.

In preparation of the polymeric pigment, any monomer or mixture of monomers can be used which is polymerizable under conditions of aqueous emulsion polymerization and which forms a polymer having the specified physical properties of being water-insoluble and non-film forming. Preferred emulsion polymerizable monomers which can be polymerized and/or copolymerized with each other in any proportions and/or with other monomers as specified hereinafter to yield such polymers include ethylenically unsaturated monomers such as the monovinylidene carbocyclic aromatic monomers, e.g., styrene, $\alpha$-methylstyrene, ar-(t-butyl)styrene, ar-methylstyrene, ar,ar-dimethylstyrene, ar-chlorostyrene, ar-(t-amyl)styrene, ar-bromostyrene, ar-fluorostyrene, ar-cyanostyrene, ar-methoxystyrene, ar-ethylstyrene, ar-hydroxymethylstyrene, ethoxystyrene, ar-chloro-ar-methylstyrene, ar,ar-dichlorostyrene, ar,ar-difluorostyrene, vinyl naphthalene, and other such emulsion polymerizable monomers having not more than 26 carbon atoms; esters, of $\alpha,\beta$-ethylenically unsaturated carboxylic acids which polymerize to form non-film forming polymers, e.g., methyl methacrylate, chloroethyl methacrylate, 2-butyl methacrylate, 3,3-dimethylbutyl methacrylate, 3,3-dimethyl-2-butyl methacrylate, ethyl methacrylate, isobutyl methacrylate, isopropyl methacrylate, phenyl methacrylate, butyl chloroacrylate, cyclohexyl chloroacrylate, ethyl chloroacrylate, methyl chloroacrylate, isopropyl chloroacrylate and other such esters capable of being polymerized to form hard polymers; $\alpha,\beta$-ethylenically unsaturated esters of non-polymerizable carboxylic acids, e.g., vinyl benzoate, vinyl ar-toluate, vinyl ar-ethylbenzoate, allyl ar-ethylbenzoate, vinyl trimethylacetate, vinyl pivilate, vinyl trichloroacetate and other such monomers wherein the unsaturated moiety has from 2 to 14 carbon atoms and the acid moiety has from 2 to 12 carbon atoms; $\alpha,\beta$-ethylenically unsaturated nitriles, e.g., acrylonitrile, methacrylonitrile, fumaronitrile and other such nitriles having not more than 12 carbon atoms; other polymerizable vinyl monomers such as vinly chloride, vinyl bromide and the like. Of the foregoing monomers, the monovinylidene carbocyclic aromatic monomers, particularly styrene, are especially preferred.

The foregoing monomers are generally classified as hard monomers as they polymerize or copolymerize with each other to form non-film forming polymers as required in the practice of this invention.

Lesser amounts, such as less than about 45 weight percent based on the polymer, of other ethylenically unsaturated monomers which normally polymerize to form film-forming polymers (so-called soft monomers) are suitably copolymerized with the foregoing hard monomers. Examples of such monomers include conjugated aliphatic dienes such as 1,3-butadiene, isoprene, 2-chloro-1,3-butadiene and other such dienes having not more than 14 carbon atoms; alkyl acrylates such as methyl acrylate, ethyl acrylate, propyl acrylate, n-butyl acrylate, isobutyl acrylate, amyl acrylate, lauryl acrylate, isoamyl acrylate, 2-ethylhexyl acrylate, octyl acrylate, and other such acrylates having alkyl moieties of not more than 18 carbon atoms; unsaturated esters of saturated carboxylic acids such as vinyl acetate, vinyl propionate, vinyl butyrate, allyl acetate and other such esters having not more than 18 carbon atoms; esters and half esters of $\alpha,\beta$-ethylenically unsaturated polycarboxylic acids, e.g., dimethyl fumarate, diethyl maleate, methyl ethyl fumarate, ethyl hydrogen maleate, dioctyl fumarate and the like; other copolymerizable vinyl monomers containing a single polymerizable ethylenically unsaturated group such as vinyl fluoride, vinylidene chloride and vinylidene fluoride. Maximum concentrations of these monomers are governed primarily by the temperature to be reached by the coating during the coating process and the degree to which a particular monomer lowers the softening point of the resulting copolymer. For illustration, if a copolymer of styrene and butadiene is to be used as the polymeric pigment, butadiene normally is not present in the copolymer in amount more than about 20 weight percent. If, however, the styrene/butadiene copolymer has more than the normal amount of cross-linking, butadiene may be present in concentration greater than 20 weight percent with the maximum concentration of butadiene being dependent on the actual degree of cross-linking. Increased cross-linking is usually promoted by irradiation or by use of a suitable cross-linking agent such as unsaturated polyester or polyethylenically unsaturated monomer. Exemplary polyethylenically unsaturated monomers include divinyl benzene, trivinyl benzene, divinyl naphthalene, and the like. In regard to the use of the aforementioned soft monomers, use in any concentration is suitable provided that the resultant polymer is non-film forming as required in the practice of this invention.

In addition to the foregoing monomers, other monomers which may also be copolymerized constituents of the polymeric pigment are $\alpha,\beta$-ethylenically unsaturated carboxylic acids including both mono- and polycarboxylic, e.g., dicarboxylic acids, such as acrylic acid, methacrylic acid, itaconic acid, fumaric acid, maleic acid and anhydride, citraconic acid and anhydride and other such acids. Maximum concentrations of these acid comonomers in the polymeric pigment are limited by the degree to which they promote water solubility of the polymer. Since the polymeric pigment is required to be water-insoluble, the acid comonomers are generally employed in concentrations not greater than 25 weight percent of the polymeric pigment, preferably not greater than about 10%, with concentrations in the range from about 0.5 to about 7 weight percent being especially preferred.

Preferred polymers used in the polymeric pigment are copolymers of from about 45 to about 99 weight percent of one or more of the aforementioned hard monomers, from about 0 to about 45 weight percent of one or more of the aforementioned soft monomers and from about 1 to about 10 weight percent of one or more emulsion copolymerizable $\alpha,\beta$-ethylenically unsaturated carboxylic acids, preferably those having 3 to 8 carbon atoms. Especially preferred copolymers are copolymers of from about 50 to about 99.5 weight percent of monovinylidene carbocylic aromatic monomers such as styrene and ar-(t-butyl)styrene, from about 0 to about 49 weight percent of $\alpha,\beta$-ethylenically unsaturated nitrile such as acrylonitrile and methacrylonitrile, and from about 0.5 to about 7 weight percent of α,β-ethylenically unsaturated carboxylic acid such as acrylic acid, methacrylic acid and itaconic acid. Examples of such especially preferred copolymers are styrene/acrylic acid copolymers, styrene/acrylonitrile/itaconic acid copolymers, styrene/methacrylic acid copolymers, and t-butyl styrene/acrylonitrile/acrylic acid copolymers. In the foregoing preferred copolymers, it is sometimes beneficial to copolymerize from about 1 to about 15 weight percent of polyethylenically unsaturated monomer such as divinyl benzene therewith.

The specific gravity of the preferred polymers used in the practice of the invention usually is within the range of about 0.9 to about 1.4 g/cc. In order that the coating be considerably lighter in weight than coatings containing inorganic pigments, it is preferable that the particles be made from a polymer which is predominantly hydrocarbon since such polymers have a specific gravity generally less than about 1.4. The refractive index of preferred polymers is generally in the range of from about 1.2 to about 1.7, especially from about 1.4 to about 1.6.

In addition to being composed of discrete particles of non-filming forming polymer as set forth hereinbefore, it is critical that the polymeric pigment be in the form of particles having an average diameter in the range from about 0.3 to about 1.0 micrometer, with no more than about 5 weight percent of the particles based on total weight of particles forming the polymeric pigment having diameters outside said range, preferably not more than 3 weight percent. The method described herein is critical to produce such polymeric particles. Moreover, such method usually produces particles which have essentially rough surfaces as observed with an electron transmission microscope. Aqueous dispersions of these rough surface particles generally provide better coatings. Also, the method often produces bimodal, or even trimodal, aqueous dispersions of polymeric particles wherein most of the polymer is in the form of particles having diameters in the range specified hereinbefore and a minor amount, e.g., not more than about 5 percent, is in the form of particles having diameters in the range of from about 0.03 to about 0.15 micrometer. In the practice of the method, it has been observed that for any given monomer system an aqueous dispersion of polymeric particles having improved coating properties is always produced as compared to aqueous dispersions made using a conventional emulsion polymerization process.

The polymeric pigment is advantageously prepared by an improved emulsion polymerization process as broadly set forth hereinbefore. More specifically, the improved emulsion polymerization process of this invention is preferably prepared in a batchwise manner indicated as follows. The polymerization zone is preferably purged with inert gas, charged with a water-soluble polymerization catalyst and water, and brought to a suitable reaction temperature. The amounts of water and catalyst initially charged to the polymerization zone are those typically employed in conventional emulsion polymerization carried out by continuous feeding of monomer during polymerization. Preferably, the amount of catalyst charged is from about 0.1 to about 1 weight percent based on total monomer and the amount of water charged is from about 50 to about 150 weight percent based on total monomer.

It is understood, however, that it is within the scope of this improved process to charge the polymerization zone with additional amounts of catalyst and water during polymerization, in fact, it is sometimes advantageous to do so. It is further understood that catalyst can be added continuously, separately or with the monomer feed stream. In addition, activators such as a sulfoxylate activator can be added intermittently or continuously to the polymerization zone in so-called "redox-catalyzed" polymerization.

As polymerization catalysts, there may be used one or more peroxygen compounds which are known to act as free-radical catalysts. Usually convenient are the persulfates (including ammonium, sodium, and potassium persulfates), hydrogen peroxide, or the perborates or percarbonates. There may also be used organic peroxides, either alone or in addition to inorganic peroxide or sulfoxylate compounds. Typical organic peroxides include benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide, and the like.

The choice of catalyst depends in part upon the particular combination of monomers to be polymerized. As might be expected, some of the monomers respond better to one type of catalyst than the other. The usual amount of catalyst required is approximately from about 0.01 percent to about 3.0 percent by weight as based on the weight of the total monomer charge.

In some instances, in order to effect polymerization at a temperature below that at which coagulation of the latex might occur, it may be desirable to activate the catalyst. The activation may be best accomplished by using a redox system in which a reducing agent within the limits of about 0.001 percent to about 6 percent as based on the weight of total monomers is present in addition to the peroxide catalyst. Many examples of such redox systems are known. Agents, such as hydrazine or a soluble oxidizable sulfoxy compound, including the alkali metal salts of hydrosulfites, thiosulfates, sulfites, and bisulfites, and the like can be employed. Redox systems may be activated by the presence of a small amount (a few parts per million) of polyvalent metal ions. Ferrous ions are commonly and effectively used or a tertiary amine which is soluble in the reaction medium may also be used as an activator.

Continuous feeding of the initial portion of total monomer is begun after water and catalyst have been charged or simultaneously therewith. The initial monomer portion constitutes from about 20 to about 99.9 weight percent of total monomer charge, preferably from about 30 to about 95 weight percent especially from about 80 to about 95 weight percent. The polymerization zone is brought to desired polymerization temperature which is advantageously in the range of from about 30° to about 98°C, preferably from about 70° to about 98°C, prior to beginning of monomer feed or shortly thereafter. It is desirable to begin inert gas purge while heating the water to the desired polymerization temperature. Thereafter, a suitable catalyst is added, and the monomer feed is begun. Generally, aqueous dispersions of polymeric particles having better coating properties are produced at the higher temperatures within the aforementioned range. The rate of monomer feed is not particularly critical; however, it is generally desirable to feed at a rate such that addition of total monomer charge will be complete in a period from about 2 to about 24 hours, preferably from about 4 to about 6 hours. It is advantageous, but not critical, to stop the monomer feed after about 7 to about 15 weight percent of the total monomer has been added and the mixture is allowed to digest for about 5 to about 60 minutes before resuming addition of the initial portion of the total monomer charge. This digestion period will hereinafter be referred to as an "initial stage digestion". Such practice usually provides a very mild exotherm in the polymerization, which otherwise, with some monomers, will occur at any unpredictable time and be quite vigorous. Surprisingly, products produced by such practice have even better coating properties than the improved products otherwise obtained. Employment of this advantageous step also reduces the amount of coagulum by-product which is often produced.

It is critical in the practice of the method of this invention that polymerization of the initial portion of total monomer be carried out essentially in the absence of soap, i.e., in the presence of very little or no conventional external emulsifying agents which are normally identified as soaps. Trace amounts of soap such as less than about 0.015 weight percent based on total monomer, and preferably from about 0.0001 to about 0.01 weight percent, may be present during polymerization without adversely affecting the product. In fact, for certain monomers, such practice produces products having even better coating properties than the improved products otherwise obtained. For the purposes of this invention, the term "soap" includes emulsifiers which are conventionally employed in emulsion polymerization, and specifically excludes polymerization catalysts and monomeric materials as defined hereinbefore.

During the initial stage of the polymerization reaction, it is preferable to permit polymerization to proceed without addition of further ingredients to the polymerization zone other than addition of catalyst and, if desired, base and/or activator, for a period of from about 1 to about 8 hours to avoid buildup of reactants. After the initial portion of monomer has been added and polymerization thereof is essentially complete, a stabilizing amount of the base is added to the polymerization recipe. As a general rule, from about 0.05 to about 10 weight percent of the base based on total monomer is an advantageous amount, with from about 0.2 to about 7.5 weight percent being preferred.

Bases suitable for the purposes of this invention are fluid, water-soluble bases, which are sufficiently basic to form salts with carboxylic acids, for example, ammonia gas, aqueous solutions of ammonia, sodium hydroxide, potassium hydroxide and other alkali metal and alkaline earth metal hydroxides, diethylamine, dimethylamine, triethylamine, trimethylamine, diethanolamine, ethyleneimine, and other alkyl or alkanol amines where.

Following addition of the base, the continuous addition of remaining monomer charge to the polymerization zone is resumed and polymerization under similar conditions of time, temperature and catalyst set forth herein is continued. During the period of addition and polymerization of remaining monomer, it is sometimes desirable to charge the polymerization zone continuously or intermittently with a stream of catalyst and, if desired, a stream of base and/or activator. It is preferred to arrange the addition of catalyst, base and/or activator such that addition thereof continues for a short period, i.e., from about ½ to about 2 hours after addition of monomer is completed. During this period of uninterrupted polymerization (so-called final stage digestion), it is generally preferred to maintain the temperature of the resulting aqueous dispersion between about 70° to about 98°C to promote further conversion of monomer to polymer.

Before cooling, the aqueous dispersion of polymeric particles may be rendered increasingly alkaline by adjusting the pH to within the range of from about 6 to about 8. This may be done by adding ammonia or a water-soluble amine or an inorganic base, such as potassium or ammonium hydroxide, or a mixture thereof. Ammonium hydroxide, usually giving the best results in the least complicated way, is often preferred.

Having permitted the alkaline, aqueous dispersion to cool to ambient temperature, the aqueous dispersion of polymeric particles can be separated from undesirable impurities such as coagulum by-product, by filtering the aqueous dispersion of polymeric particles through a stainless steel filter having the filter surface perforated to correspond with the standard 16 mesh size of the U.S. Standard Sieve Series.

The filtered aqueous dispersion of polymeric particles prepared by the method described above and ordinarily containing from about 20 to about 60 weight percent, preferably from about 40 to about 50 weight percent, of non-film forming polymeric solids which form the polymeric pigment of this invention is ready to be combined with a suitable binder to provide a paper coating composition.

The paper coating so described may be made by dispersing the polymeric particles (pigment) of the aqueous dispersion in an aqueous medium containing the binder or by blending the aqueous dispersion with the aqueous medium containing the binder, thus eliminating the step of separating the particles from the aqueous dispersion. Generally, suitable ratios of binder to polymeric pigment in the coating range from about 1.3 to about 11.5 volume parts of binder, dry basis, to 38.8 volume parts, calculated on a dry basis, of polymeric particles. The preferred ratios range from about 6.7 to about 10 volume parts of binder to 38.8 volume parts of polymeric particles.

It is further understood that a combination of inorganic pigment and polymeric pigment is contemplated in the practice of this invention. In such combination the polymeric pigment is used in an amount which is effective to lower weight and/or to enhance the coating properties of gloss, pick resistance, printing qualities, brightness or the like as compared to a coating containing only the inorganic pigment as pigment. Preferably, the polymeric pigment constitutes at least about 1 weight percent of the total pigment. Suitable inorganic pigments for this purpose include clays such as kaolinite, illite, montmorillonite and beidellite; and other materials such as titanium dioxide, Kieselguhr, calcium carbonate, calcium sulfate, calcium sulfite, blanc fixe, satin white, and zinc pigments, e.g., zinc oxide, zinc sulfide and lithopone.

Binders suitable for the purposes of this invention include coating compositions which are non-solvents for the polymeric pigment to be used and which are adaptable to a paper coating process to provide an adherent, smooth, glossy layer suitable for printing. Exemplary suitable binders include the natural binders such as starch, modified starch, soy bean, protein and casein and commonly known synthetic binders. Suitable modified starch binders include oxidized, enzyme converted, or hydroxy-ethylated starch. Suitable synthetic binders include the styrene/butadiene copolymer latexes; the latexes of polymers of alkyl esters of α,β-ethylenically unsaturated carboxylic acids such as the alkyl acrylates and methacrylates, especially such aqueous dispersions of polymers which include a small amount of a copolymerized ethylenically unsaturated carboxylic acid; the latexes of copolymers of butadiene and acrylonitrile, latexes of copolymers of vinyl acetate and the alkyl acrylates, latexes of copolymers of butadiene and methyl methacrylate, latexes of copolymers of vinyl chloride and vinylidene chloride, latexes of vinyl chloride polymers, latexes of vinylidene chloride copolymers; aqueous dispersions of polybutadiene, polyvinyl acetate, polyvinyl alcohol and other synthetic polymers commonly used as pigment binders in paper coatings. As is typical of such binders, they are preferably film-forming at room temperature and must be film-forming at temperatures used in the paper coating operation.

The coating is applied to a paper substrate by a conventional technique such as air knife, trailing blade, inverted blade, roll coaters, sprayers and the like.

After the coating is applied, the surface of the substrate is dried and often is then finished by calendering or supercalendering. It is critical that the temperature of the coating does not exceed the softening point of the polymeric particles, otherwise the particles will lose their discrete character or proper size and shape. When this occurs, the opacity and brightness of the coated surface drops substantially.

The use of polymeric pigment as at least a portion of the pigment in a paper coating composition reduces the time required to dry coatings of such compositions and improves finish and visual gloss to papers coated with such compositions.

Where the solvent sensitivity of a specific polymeric pigment presents a problem, a coating containing the polymeric pigment may be applied to the paper substrate as a base coating and such base coating is subsequently coated with a coating containing an inorganic pigment which is not as sensitive to solvents. Since by that procedure much less coating containing the inorganic pigment will be required to yield a surface with the desired gloss and opacity, the total coating weight is usually reduced about 25 percent.

The following examples illustrate the invention, but are not to be construed as limiting its scope. Except as indicated, all parts and percentages are by weight. Weights parts are based on 100 weight parts of total monomers unless otherwise indicated.

EXAMPLE 1

Into a five-liter reaction vessel equipped with an agitator, reflux condenser, dropping funnels, thermometer, inert gas line, temperature control apparatus and temperature monitor, is added 85 parts of water. After the water is heated to 90°C, an inert gas purge is begun and 0.5 part of sodium persulfate is added. A continuous monomer stream consisting of 97 percent styrene and 3 percent acrylic acid is begun at the constant rate of addition of about 22.2 parts per hour.

After about thirty minutes and approximately 11.1 parts of the monomers have been added, the monomer feed is stopped, and eight parts of a separate continuous addition stream consisting of 88 percent water and 12 percent sodium persulfate is begun at a continuous rate of 1.4 parts per hour.

After about 15 minutes, an exothermic condition of the polymerization medium is observed to occur. At this time the monomer feed is resumed at the previously specified rate. After about 3 more hours of continuous addition of the monomer and catalyst solution streams, approximately 84.8 parts of the total 100 parts of monomers have been added to the reaction vessel. At this time, the monomer stream is stopped and 10 parts of a 25 percent ammonium hydroxide solution is added over a 2 to 5 minute period.

After an additional period of forty minutes the monomer addition is continued at rate of about 22.2 parts per hour until all of the 100 parts of monomer has been added. The continuous addition stream of catalyst and water is finished about one hour and a half after the monomer feed is complete. The reaction mixture is digested for an additional 55 minutes at 82°C and cooled to ambient temperature with stirring. The product is filtered through a 200 mesh screen and yields 0.7 percent residue based on polymer solids. The resulting aqueous dispersion contains 49.3 percent polymer solids having an average particle diameter of 0.4 micrometer and scattering coefficient, as determined by the following method, of 0.300.

In determining scattering coefficient of a particular latex, the latex is combined with an ethylated starch binder composition in weight on dry basis of 38.5 weight parts (36.7 volume parts) of latex to 10 weight parts (6.7 volume parts) of starch to form a coating composition. The coating composition is applied with drawdown bars to a polished black glass plate in an amount sufficient to form a film having a wet thickness of 1.5 mil and to a polished white glass plate in amount sufficient to form a film having a set thickness of 3.0 mils and air dried at room temperature. Brightnesses for the coated black and coated white glass plates are determined by TAPPI Test Method T452-M-58 and used in calculation of scattering coefficient. Scattering coefficient is calculated using the equation:

$$\text{Scattering coefficient} = \frac{ST}{220A}$$

wherein ST is a value read directly from Mitton-Jacobsen Graphs plotting the ST value against reflectance of the coating over black and white glass plates and A is the weight in grams of five square inches of coating. Reflectance is equal to 0.01 × brightness. The Mitton-Jacobsen Graphs are described in the *Official Digest*, September, 1963, pp. 885–911.

EXAMPLE 2

The procedure of Example 1 is repeated several times with the addition of the fluid base at various times during polymerization. The resulting aqueous dispersions of Run Nos. 3–10 contain 47–50% particle solids and have average particle diameters in the range of 0.35 to 0.6 micrometer and scattering coefficients and brightnesses as shown in Table I. The percent yields of coagulum by-products formed in the several runs are also shown in Table I.

TABLE I

| Run No. | % Monomer (a) Added Prior to Addition of Base | % Yield of Coagulum | Scattering Coefficient (1) | Brightness(2) |
|---|---|---|---|---|
| 1* | 0 | 100 | ND | ND |
| 2* | 15 | 23 | ND | ND |
| 3 | 35 | 5.9 | 0.25 | 92.3 |
| 4 | 50 | 4.6 | 0.26 | 92.9 |
| 5 | 63 | 1.5 | 0.26 | 92.1 |
| 6 | 70 | 1.7 | 0.26 | 91.6 |
| 7 | 82 | 0.9 | 0.29 | 91.7 |
| 8 | 94 | 0.6 | 0.31 | 92.1 |
| 9 | 99 | 0.35 | 0.28 | 91.8 |
| 10* | 100 | 3.5 | 0.164 | 81.9 |

ND - Not determined because of gelation and/or high viscosity of aqueous dispersion.
*Not an example of this invention.
(a)Monomer - 97% styrene and 3% acrylic acid.
(1)Measured by method described in Example 1.
(2)TAPPI Test Method T452-M-58 on white glass plate.

As evidenced by the foregoing data, the fluid base must be added during polymerization after more than 15 weight percent and less than all of total monomer has been polymerized.

EXAMPLE 3

Following the general procedure of Example 1, several runs are made wherein different bases are added to the emulsion polymerization recipe after 90 percent of total monomer (95% styrene/5% acrylic acid) has been added to the reactor. The brightnesses and scattering coefficients are determined for each of the resulting aqueous dispersions and the results are recorded in Table II. The average particle diameters of the aqueous dispersions are in the range of 0.35 to 0.6 micrometer.

TABLE II

| Run Nos. | 1 | 2 | 3 |
|---|---|---|---|
| %Solids of Aqueous Dispersion | 47.0 | 49.1 | 51.4 |
| Base Type (3) | DMAE | NaOH | NH$_3$ |
| Amount, active pph (4) | 2 | 0.36 | 2 |
| Scattering Coefficient (1) | 0.24 | 0.25 | 0.30 |
| Brightness (2) | 92.9 | 92.4 | 93.3 |

(1)-(2) Same as in Table I.
(3) DMAE - 2-dimethylaminoethanol (100% active).
NaOH - aqueous solution of NaOH (10% active).
NH$_3$ - bubbling ammonia gas.
(4) Parts of base per hundred parts of total monomer.

EXAMPLE 4

Following the general procedure of Example 1, several runs are made wherein different monomer compositions are copolymerized and an aqueous solution of ammonium hydroxide (28% active) is added at different points during polymerization as specified in Table III. The brightness and scattering coefficients are determined for each of the resulting aqueous dispersions and the results are recorded in Table III.

TABLE III

| Run Nos. | 1 | 2 | 3 |
|---|---|---|---|
| Monomer Composition Type(a) | VT/MAA | STY/VCN/IA | TBS/VCN/MAA |
| Amount,% | 95/5 | 90/72/2.5 | 50/47/3 |
| % Solids of Aqueous Dispersion | 48.8 | 49.4 | 47.7 |
| Amount of Base, active pph | 1.68 | 1.4 | 1.9 |
| Time of Base Addition, % | 87 | 89 | 93 |
| Scattering Coefficient(1) | 0.26 | 0.19 | 0.24 |
| Brightness(2) | 92.1 | 90.8 | 76.4 |

(a)VT-vinyl toluene, MAA-methacrylic acid, Sty-styrene, TBS-t-butyl styrene, VCN-acrylo-nitrile, IA-itaconic acid.
(1)-(2) Same as in Table I.

EXAMPLE 5

Following the general procedure of Example 1, several runs are made wherein different amounts of acrylic acid are employed and different amounts of an aqueous solution of ammonium hydroxide is added after 94% of total monomer has entered the reactor. The scattering coefficient is determined for each of the resulting aqueous dispersions, and the results are recorded in Table IV.

TABLE IV

| Run Nos. | 1 | 2 | 3 |
|---|---|---|---|
| Monomer Composition Type(a) | Sty/AA | Sty/AA | Sty/AA |
| Amount, % | 95/5 | 92.5/7.5 | 90/10 |
| % Solids of Aqueous Dispersion | 48.0 | 48.5 | 50.0 |
| Amount of Base,pph(2) | 3.1 | 0.75 | 0.97 |
| Scattering Coefficient(1) | 0.27 | 0.22 | 0.19 |

(a)Sty-styrene, AA-acrylic acid.
(1)Same as in Table I.
(2)Same as (4) in Table II.

EXAMPLE 6

A run is made following the procedure of Example 1 except that 0.5% of NH$_4$OH [as an aqueous solution (28% active) based on total monomer] is added to the emulsion polymerization recipe after 89% of total monomer has been added. The scattering coefficient and brightness for a composition containing the resulting dispersion are determined to be 0.27 and 93.1, respectively.

EXAMPLE 7

As evidence of minimal coagulum build-up during practice of the present invention, successive identical runs are made in the same reactor without clean up. The general procedure of Example 1 is employed for each run except that 0.003 part of active NH$_4$OH per hundred parts of total monomer is added after 94 percent of total monomer is added to the polymerization reactor. The percent of coagulum buildup, opacity and brightness for each of the successive runs are recorded in Table V. For purposes of comparison, the foregoing successive runs are repeated (Run A-E) except that soap in the amount of 2 parts of an aqueous solution of sodium dodecyl diphenyl ether disulfonate (45% active) and 4 parts of octyl phenyl polyethoxyethanol (70% active) is substitued for the NH₄OH. The percent coagulum buildup, opacity and brightness are recorded for each of these successive runs in Table V.

TABLE V

| Run | Scattering Coefficient (1) | % Brightness (2) | % Coagulum (3) |
|---|---|---|---|
| 1 | 0.244 | 91.9 | 0.56 |
| 2 | 0.262 | 92.2 | 1.42 |
| 3 | 0.262 | 92.4 | 2.04 |
| 4 | 0.244 | 92.2 | 2.32 |
| 5 | 0.273 | 92.6 | 3.39 |
| A* | 0.266 | 91.7 | 1.03 |
| B* | 0.297 | 91.6 | 2.34 |
| C* | 0.165 | 90.1 | 8.50 |
| D* | 0.182 | 90.9 | 14.0 |
| E* | 0.180 | 90.5 | 16.7 |

*Not an example of the invention.
(1)-(2) Same as in Table I.
(3) % Coagulum based on total monomer.

EXAMPLE 8

As evidence of the excellent calendering characteristics of the plastic pigments of the present invention, several coating runs are made using pigments made under conditions varying within the scope of the invention. In these runs, the pigments are combined with conventional starch binder at a pigment to binder ratio of 38.5:10. The resulting compositions are applied at a coat weight of ~5 pounds per book ream to bleached kraft paper and calendered under the conditions specified in Table VI. The tendency of the coated papers to stick to the calender roll is observed and recorded in Table VI.

For purposes of comparison, several similar runs (Run A-D) are made using pigments prepared with the soap used in Runs A-E of Example 7 instead of NH₄OH. The tendency of these coated papers to stick to the calender roll is also noted and recorded in Table VI.

TABLE VI

| Run No. | Monomer Composition Type(a) | Amount | Amount of(1) NH₄OH, pph | 170°F, 4 nips | Calender Sticking(2) 190°F. 4 nips | 210°F, 4 nips |
|---|---|---|---|---|---|---|
| 1 | Sty/AA | 97/3 | 14.4 | Good | Bad | Bad |
| 2 | " | 97/3 | 22.1 | " | Good | Poor |
| 3 | " | 97/3 | 66.2 | " | Good | Fair |
| 4 | " | 95/5 | 14.4 | " | Poor | Good |
| 5 | " | 92.5/7.5 | 14.4 | " | Good | Good |
| 6 | " | 90/10 | 14.4 | " | Good | Good |
| A* | " | 97/3 | — | Fair | Poor | Bad |
| B* | " | 95/5 | — | Poor | Bad | " |
| C* | " | 92.5/7.5 | — | Good | Good | " |
| D* | " | 90/10 | — | Good | Good | " |

*Not an example of the invention.
(a)Sty/AA-Styrene/acrylic acid copolymer.
(1)Amount of 28% aqueous NH₄OH added per hundred parts of monomer after 94 percent of total monomer added to polymerization reactor.
(2)Calender Sticking determined on a two roll pilot calender having a chrome plated steel bottom roll (10" diameter) and a face fiber filled bottom roll (16" diameter) using a calender pressure of 500 pounds/lineal inch and a web speed of 35 feet per minute. A rating of good indicates no sticking, curling or peeling; fair-slight sticking but no curling or peeling; poor-substantial sticking, curling, but no peeling; and bad-sticking, curling and some peeling.

As evidenced by the foregoing data, resistance of the coating to sticking to the calender roll is improved considerably by increasing the amount of acid in the copolymer and/or the amount of ammonium hydroxide added during polymerization.

What is claimed is:

1. A method for preparing an aqueous dispersion of polymeric particles which are non-film forming at ambient temperature and are useful as pigment in paper coatings, said particles having rough surfaces and an average particle diameter in the range from about 0.3 to about 1.0 micrometer with no more than about 5 weight percent of said particles based on total weight of particles having diameters outside said range, which method comprises the steps of (1) subjecting to emulsion polymerization a polymerization reaction mixture comprising an aqueous medium, a catalyst and an incrementally-added initial portion of emulsion polymerizable monomer, essentially in the absence of external emulsifiers which are conventionally employed in emulsion polymerization wherein the term external emulsifiers excludes polymerization catalysts and monomeric materials, said initial portion constituting at least about 35 weight percent up to and including 99.9 weight percent of total monomer, (2) subsequently adding from about 0.05 to about 10 weight percent based on total monomer of a fluid base to the recipe; and (3) continuing addition and emulsion polymerization of the remaining portion of the total monomer, said total monomer being capable of polymerizing to form a non-film forming polymer.

2. The method of claim 1 wherein the amount of base is in the range from about 0.05 to about 10 weight percent of total monomer.

3. The method of claim 1 wherein the initial portion of monomer constitutes from about 80 to about 95 weight percent of total monomer.

4. The method of claim 1 wherein the base is ammonia.

5. The method of claim 1 wherein the amount of base is in the range from about 0.2 to about 7 weight percent of total monomer.

6. The method of claim 1 wherein total monomer comprises at least 45 weight percent of a monovinylidene carbocyclic aromatic monomer.

7. The method of claim 6 wherein the monovinylidene carbocyclic aromatic monomer is styrene.

8. The method of claim 1 wherein (1) total monomer polymerizes to form a copolymer which is non-film forming at ambient temperature comprising from about 45 to about 99.5 weight percent polymerizable hard monomer selected from the group consisting of monovinylidene carbocyclic aromatic monomer, esters of α,β-ethylenically unsaturated carboxylic acids which polymerize to form non-film forming polymers, α,β-ethylenically unsaturated esters of non-polymerizable carboxylic acids which polymerize to form non-film forming polymers, α,β-ethylenically unsaturated nitriles, other vinyl monomers which polymerize to form non-film forming polymers and mixtures of said hard monomers; up to about 45 weight percent of an emulsion polymerizable soft monomer selected from the group consisting of conjugated aliphatic dienes, alkyl acrylates, unsaturated esters of saturated carboxylic acids, esters and half esters of α,βethylenically unsaturated polycarboxylic acids, other vinyl monomers which polymerize to form film forming polymers, and mixtures of said soft monomers; and from about 0.5 to about 10 weight percent of at least one α,β-ethylenically unsaturated carboxylic acid, and (2) the base is selected from the group consisting of ammonia gas, aqueous solutions of ammonia, alkali metal hydroxides and alkaline earth metal hydroxides, alkyl and alkanol amines.

9. The method according to claim 1 wherein total monomer polymerizes to form a non-film forming copolymer comprising from about 50 to about 99 weight percent of monovinylidene carbocyclic aromatic monomer; from about 0 to about 49 weight percent of emulsion polymerizable, α,β-ethylenically unsaturated nitrile and from about 1 to about 5 weight percent of emulsion polymerizable, α,β-ethylenically unsaturated carboxylic acid.

10. An aqueous dispersion of non-film forming polymeric particles having an average diameter in the range from about 0.3 to about 1.0 micrometer with no more than about 5 weight percent of said particles having diameters outside of said range, said dispersion being prepared by the method of claim 1.

11. The aqueous dispersion according to claim 10 wherein the polymeric particles comprise a copolymer of from about 50 to about 99 weight percent of monovinylidene carbocyclic aromatic monomer; from about 0 to about 49 weight percent of emulsion polymerizable α,β-ethylenically unsaturated nitrile and from about 1 to about 5 weight percent of emulsion polymerizable α,β-ethylenically unsaturated carboxylic acid wherein the copolymer is non-film forming at 140°F or less.

12. An aqueous paper coating composition adapted to a paper coating process for printing comprising a binder and a pigment wherein at least a portion of the total pigment is in the form of discrete, non-film forming polymeric particles having an average diameter in the range of from about 0.3 to about 1.0 micrometer, with no more than 5 weight percent of said particles having diameters outside of said range, said particles being formed by the method of claim 1, said coating composition containing from about 1.3 to about 11.5 volume parts of binder per 38.8 volume parts of pigment, said portion of polymeric particles being sufficient in said coating composition to produce a coating having improved properties, said particles being insoluble in water and the binder.

13. A coated paper comprising a paper substrate having intimately adhered thereto an improved coating comprising a binder and a pigment, at least a portion of said total pigment being in the form of discrete, non-film forming polymeric particles having an average diameter in the range of from about 0.3 to about 1.0 micrometer, with no more than 5 weight percent of said particles having diameters outside of said range, said particles being formed by the method of claim 1, the volume ratio of binder to pigment being in the range from about 1.3 to about 11.5 volume parts of binder to 38.8 volume parts of pigment, said portion of polymeric particles being sufficient in said coating to impart improved properties.

14. The method of claim 1 wherein the initial portion constitutes from about 35 to about 95 weight percent of total monomer.

15. The method of claim 1 wherein the initial portion constitutes from about 80 to about 95 weight percent of total monomer.

* * * * *